(12) United States Patent
Hennessy

(10) Patent No.: US 7,371,968 B1
(45) Date of Patent: May 13, 2008

(54) DETACHABLE SUPERCONDUCTING CABLE

(76) Inventor: Michael J. Hennessy, 9 Patroon Pl., Ballston Lake, NY (US) 12019

( * ) Notice: Subject to any disclaimer, the term of this patent is extended or adjusted under 35 U.S.C. 154(b) by 436 days.

(21) Appl. No.: 10/858,459

(22) Filed: Jun. 1, 2004

Related U.S. Application Data

(60) Provisional application No. 60/474,326, filed on Jun. 2, 2003.

(51) Int. Cl.
*H01B 12/00* (2006.01)
(52) U.S. Cl. ............... 174/125.1; 174/15.4; 29/599
(58) Field of Classification Search ........... 174/15.4, 174/15.5, 125.1
See application file for complete search history.

(56) References Cited

U.S. PATENT DOCUMENTS 3,959,576 A * 5/1976 Penczynski et al. ....... 174/15.3
6,049,036 A * 4/2000 Metra ...................... 174/15.5
6,743,984 B2 * 6/2004 Nassi et al. ............. 174/125.1

\* cited by examiner

*Primary Examiner*—Ishwar Patel
(74) *Attorney, Agent, or Firm*—Leonard Cooper

(57) ABSTRACT

A detachable superconducting lead includes a vacuum-sealed thermal transition through which a stabilized conductor passes. Two identical leads are attached and surrounded by a sealed Dewar and allowed to cool either naturally or by way of a cooling element. Detaching the leads requires the joint to be heated up by a heat transfer unit or by a heat gun after the Dewar is removed. Once warmed, the lead can be disassembled with tooling appropriate to the joint. In many instances, regular fasteners can be used. Removable Dewars may be constructed with insulation (including vacuum) using O-rings and flanges.

12 Claims, 4 Drawing Sheets

DETACHABLE SUPERCONDUCTING CABLE

This patent claims the benefit of provisional patent application 60/474,326, filed Jun. 2, 2003.

BACKGROUND OF THE INVENTION

An important issue in large cryogenic power systems is that of maintenance, for example, the ability to easily access, maintain, and repair or interchange electric elements housed inside an evacuated Dewar. In order to achieve this, electronic elements must be removable. That is, one must be able to physically and electrically isolate an electrical element (including superconducting cables) and remove it from the system to maintain or repair the element without disrupting either the vacuum or the temperature control within the remainder of the system. This creates problems when superconducting busses are used to connect the various elements within the system. Superconducting cables currently in use and under development are not easily detachable. Disassembly can compromise the Dewar and vacuum spaces, increasing refrigeration loads (losses). FIG. 1 shows the current art 10, which is a completely sealed cryogenic container 28, 22, 28' including welded sections, flanges or O-rings 11, 12. The cable 21 is continuous. In order to service the system, i.e., to assemble or replace a lead 21, the cryogenic spaces 23 need to be warmed, the cryogenic fluids or gases in the spaces 23 removed, and the vacuum system brought up to atmospheric pressure. Then, access to the leads 21 is accomplished by removing seals and, in some cases, un-welding some of the metallic vacuum spaces. Reassembly requires replacing the seals and in many cases re-welding the structure. This costs much time and labor.

SUMMARY OF THE INVENTION

In accordance with the present invention a method and apparatus are provided for interconnecting and disconnecting superconducting or cryogenically cooled cables without substantial disturbance to operating conditions; i.e., temperatures, vacuum, refrigeration system loading, in the system where the cables operate.

DESCRIPTION OF PREFERRED EMBODIMENTS

This innovation addresses a solution to this assembly/disassembly problem for superconducting or low temperature cables. It can be applied to cryogenic systems with superconducting distribution networks including power splitters, T's, in-line connectors, etc., that is, anywhere a general-purpose superconducting connection is required.

Figure 1:
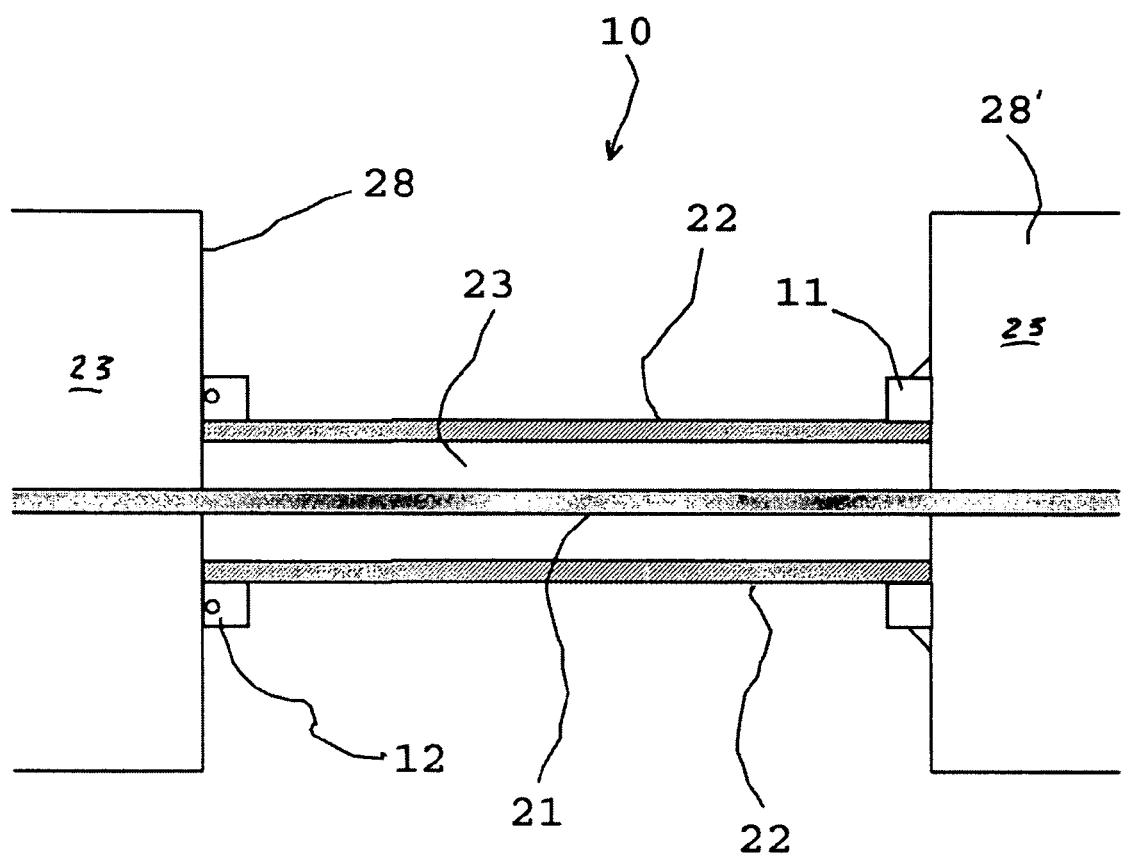
FIG. 1 illustrates a current state of the art interconnection between modules.
Figure 2:
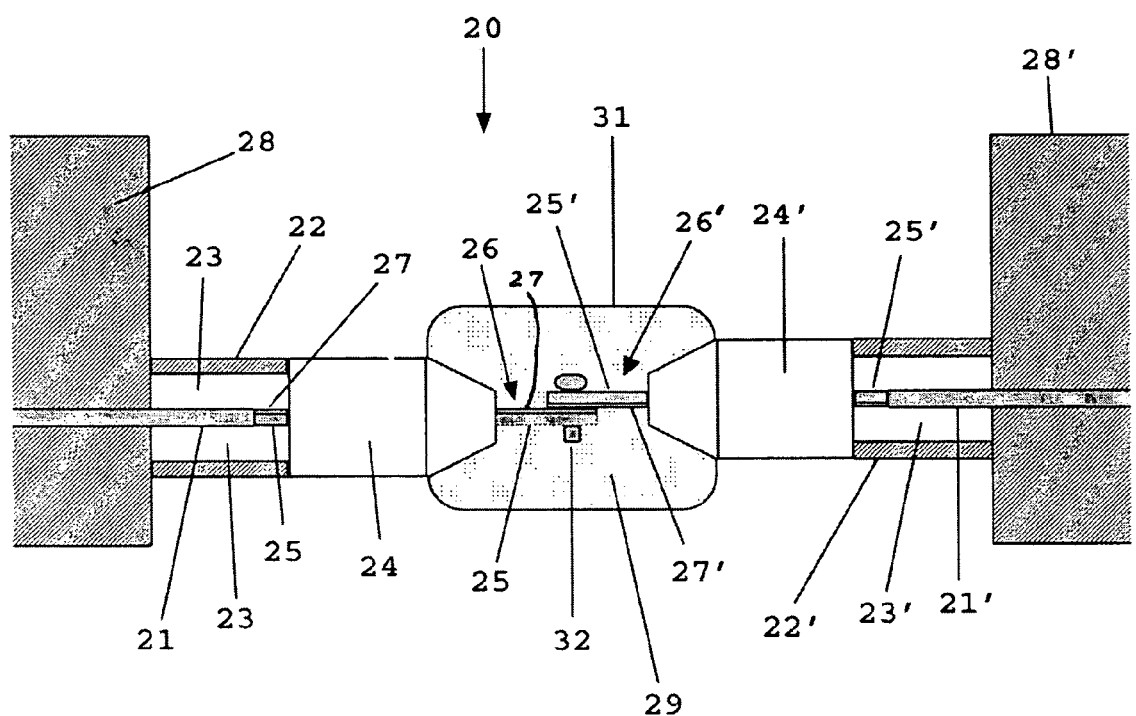
FIG. 2 is a detachable lead interconnection in accordance with the invention.

In FIG. 2, the method and apparatus 20 is illustrated for attaching and detaching superconducting cables 21, 21' without compromising the insulation, the vacuum, or cryogenic spaces, and without requiring that the attached subsystems 28, 28' be heated up to do so. FIG. 2 is a specific example of the detachable superconducting cable concept 20 for high temperature superconductors at 77 K, although it equally applies to all superconductors at any temperature below superconducting transition temperature ($T_c$) when constructed with the proper insulation systems. The superconducting cables 21, 21' are housed in cryogenic dewars 22 and 22' with special sealed terminations 24, 24'. The cables 21, 21' at their ends include two elements, the superconductor 27, 27' and a stabilizer element 25, 25' in parallel (or another stabilizer construction).

The end of the superconducting cable 26 is a copper-stabilized superconducting lead 25, which passes through the vacuum-sealed thermal transition 24. The end 26' is similarly constructed. (Copper or any stabilizing metal can be used for the stabilizer 25, 25' to prevent the lead 27, 27' from burning out if the superconductor quenches. The amount of stabilizing material used depends on an operational/fault assessment.) Externally of the transitions 24, 24' the two cables 26, 26' are bolted together in such a way that the superconducting element 27 of the first cable 21 is joined to superconducting element 27' in the second cable 21', as shown in FIG. 2. Attachment of the exposed ends 26, 26' of the cables via the fastener 32 can be made at room temperature even when non-exposed portion of the superconducting cables 21, 21' and associated circuits 23, 23' are held at low temperature. To do this requires that the exposed ends 26, 26' of the cables be warmed. This warming can be accomplished naturally by exposing them to air, by attaching them to a warm heat sink, or by heating them with a heat gun or other heater.

The terminations 26, 26', bolted together with the fastener 32, are covered with electrical insulation and aluminized mylar 29 in a removable Dewar 31, which clamps around the joint, forming a leak-tight seal with the ambient and with the thermal transitions 24, 24'. The interface connections between the exposed cable ends 26, 26' with the respectively connected thermal transitions 24, 24' are leak tight. The Dewar 31 is a removable conventional vacuum wall Dewar, a sealed foam Dewar, or a combination of both. The joint, after connection, cools down naturally with the sealed Dewar 31 around it by thermal conduction. In this process, heat is absorbed from the joint via the thermal transitions 24, 24' into the cryogenic space 23, 23'. The equilibrium temperature of the joint depends on the heat flowing from the outside ambient through the Dewar 31 and thermal transitions 24, 24'.

When disassembling a joint, the Dewar 31 is first removed to allow the joint to heat up at the exposed portions 26, 26' 32.

Figure 3:
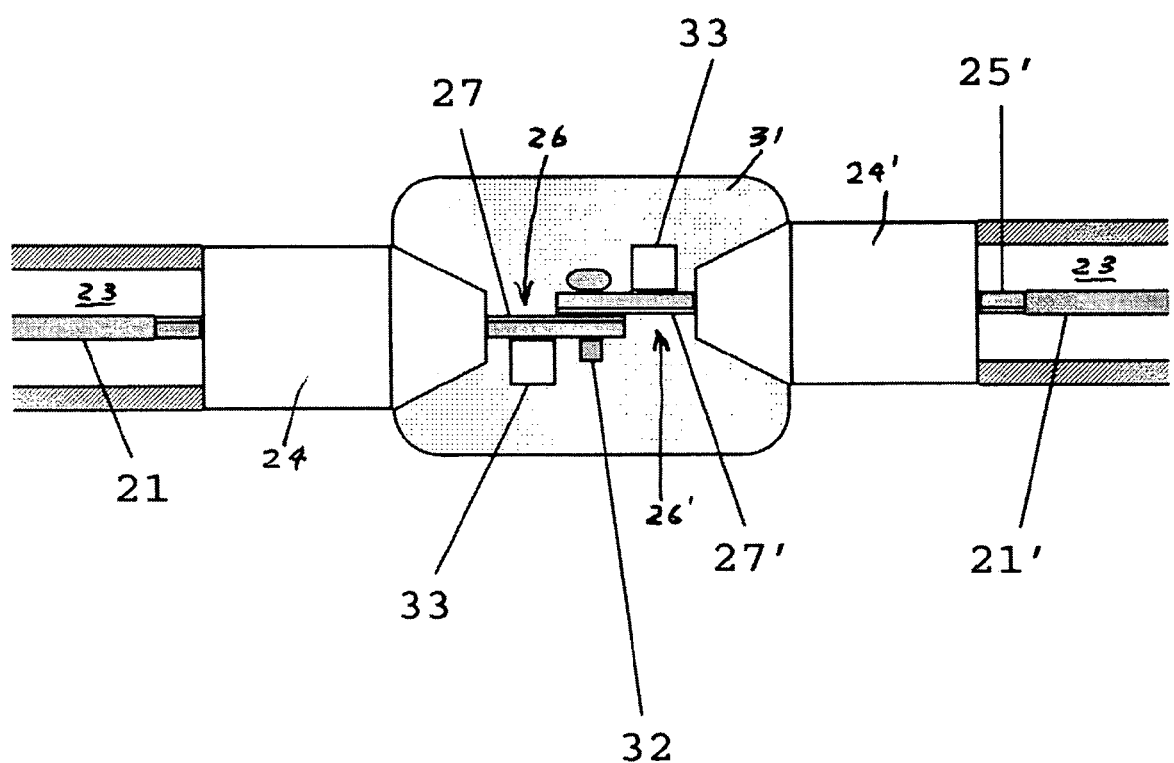
FIG. 3 shows a detachable lead interconnection similar to FIG. 2, with integral heaters and coolers.

The terminations 26, 26' of the cables 21, 21' can also be outfitted with permanent heating/cooling elements 33, shown in FIG. 3, which are used to control the temperature of the ends 26, 26'. The heating/cooling elements 33 prepare the joint terminations 26, 26' for attachment or detachment. When reattaching the leads, the elements 33 cool down the leads below $T_c$ so they can be put back into service with reduced time delay. Also, if the natural equilibrium temperature reached during cooling (FIG. 2) is above the superconducting transition temperature $T_c$, the joint can be cooled down to a temperature below $T_c$ using the heat exchanger in the element 33. Cooling the joint below $T_c$ makes the cable and joint almost lossless (superconducting) except for the contact resistance between superconductors 27, 27'. This operating condition dramatically reduces the overall heat loads of the system, especially for continuous high-current operation. The maximum static heat load occurs during maintenance, when the exposed joint is at room temperature. By proper design, this heat load can be made tolerable in most circumstances.

The heat exchangers 33 operate with a heat exchange gas or liquid. For 77 K operation, liquid nitrogen or cold nitrogen gas can be used for cooling, and heated nitrogen gas can be used for heating. Other cryogenic gases or compatible mixed refrigerants may be used in the heat exchangers 33. The heat exchangers 33 can also contain electric heaters or thermoelectric coolers. Basically, the heat exchangers 33 speed up procedures when connecting and disconnecting the cables 21, 21', and can greatly reduce the heat loads on the connected system's refrigeration unit(s) during transient conditions such as connection and disconnection. Warmed cable ends are available for connection and disconnection as circumstances may require.

Figure 4:
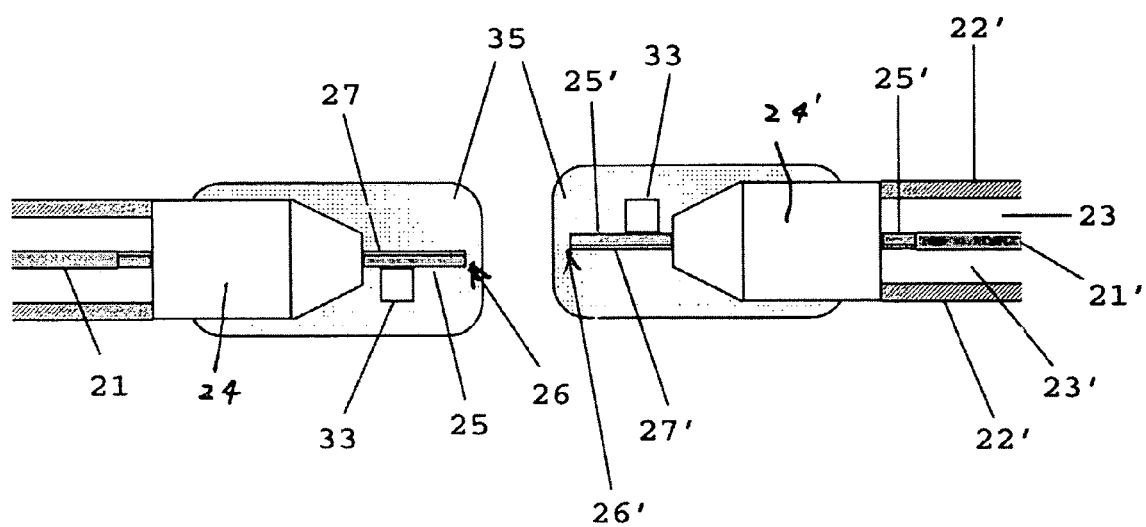
FIG. 4 shows the detached leads of FIG. 3, disconnected and with insulating caps.

Detaching the cables 21, 21' is straightforward. Once the joint terminations 26, 26' are warm, the removable Dewar 31 can be removed and tooling can be applied to detach the joint. Once the cables are detached, the heat losses (loads) to the cryogenic subsystems 28, 28' are minimized by covering the ends with an insulating cap or Dewar 35 (FIG. 4). Heat conduction (load) from the terminations 26, 26' to the cables 21, 21' are reduced by first covering the open terminations, each with a separate insulating cap 25. Then (if needed) the ends 26, 26' are cooled using the heat exchangers 33 as cooling elements.

Many types of connections between the superconductor 27, 27' can be made using the removable and temporary Dewars 31, 35, including spot welding, soldered connections, multi-pin (coax, triax, etc.) plug/sockets, quick disconnects, etc. One can even envision detachable leads with true superconducting joints that have no resistance. This usually requires special materials technology. For example NbTi low temperature superconductors (LTS) incorporate spot welding. NbSn requires special heat treatment. The key to a good overall design is the vacuum-sealed thermal transition 24, 24, which should provide the minimum heat loss (load) when the joint is cold and yet be strong enough to stand off a vacuum during thermal cycling of the transitions 24, 24'. Low conductivity ceramics, stainless steel, and epoxies may be employed for the transitions 24, 24. Also provisions must be made for thermal expansion and contraction during thermal cycling (designs allowing flexure, incorporating bellows, braided cables, etc.). Each cable or cryogenic subsystem can be part of a distributed or centralized refrigeration system. For the case of centralized refrigeration, provisions for connecting, disconnecting or bypassing sections using conventional cryogenic plumbing (not shown) is assumed. These issues can be accommodated by good engineering practices.

It should be understood that in alternative embodiments (not shown) in accordance with the invention, the stabilizer 25, 25' may be omitted from the cables 21, 21'.

What is claimed is:

1. A detachable connection for a superconducting cable in a system having electric elements, at least a portion of said system and elements being maintained in a sub ambient temperature and pressure environment, comprising:
   a first superconducting cable having a first portion and a second portion, said first portion being in said system environment, said second portion being outside said system environment;
   a first thermal transition providing a barrier between said system environment and outside said system environment, said first thermal transition being sealed and leak tight with said System environment, said second portion of said first superconducting cable extending through said first transition barrier to the outside, a first interface between said first superconducting cable and said first thermal transition being sealed and leak tight;
   a second superconducting cable having a first portion and a second portion, said first portion of said second superconducting cable being in said system environment, said second portion of said second superconducting cable being outside said system environment;
   a second thermal transition providing a barrier between said system environment and outside said system environment, said second thermal transition being sealed and leak tight with said system environment, said second portion of said second superconducting cable extending through said second transition barrier to the outside, a second interface between said second superconducting cable and said second thermal transition being sealed and leak tight;
   wherein the first superconducting cable and the second superconducting cable are electrically connected.

2. The detachable connection as in claim 1, wherein said first thermal transition presents a high thermal impedance to heat flow into said system environment from outside said system environment.

3. The detachable connection as in claim 1, wherein said second thermal transition presents a high thermal impedance to heat flow into said system environment from outside said system environment.

4. The detachable connection as in claim 1, further comprising an electrical connection between said extended second portions of said first superconducting cable and said second superconducting cable, and
   an insulation unit surrounding said connected second portions and extending to said first and second thermal transitions and sealed thereto, said insulation unit including at least one of thermal insulation and electrical insulation.

5. The detachable connection as in claim 4, wherein said insulation unit is reversibly detachable.

6. The detachable connection as in claim 4, wherein said connection of said extended second portions includes a superconductive joint between said first cable and said second cable.

7. The detachable connection as in claim 1, further comprising a first heat transfer unit thermally connected to said second portion of said first cable, said first heat transfer unit being capable of exchanging heat with said thermally connected second portion independently of any other system heat transfer unit.

8. The detachable connection as in claim 7, wherein said first heat transfer unit is physically connected to said second portion of said first cable.

9. The detachable connection as in claim 7 further comprising a second heat transfer unit thermally connected to said second portion of said second cable, said second heat transfer unit being capable of exchanging heat with said second portion of said second cable independently of any other system heat transfer unit.

10. The detachable connection as in claim 9, wherein said second heat transfer unit is physically connected to said second portion of said second cable.

11. The detachable connection as in claim 1, further comprising an insulating cap, said cap surrounding said second portion of said first cable and engaging said first thermal transition to reduce heat flow into said system environment from outside said system environment.

12. The detachable connection as in claim 11, wherein said cap is removable.

\* \* \* \* \*